United States Patent [19]
Geiger et al.

[11] Patent Number: 5,268,751
[45] Date of Patent: Dec. 7, 1993

[54] AUXILIARY SIGNAL TO ASSIST CONVERSION OF A LETTERBOX STANDARD ASPECT RATIO TELEVISION SIGNAL TO A WIDE ASPECT RATIO SIGNAL

[75] Inventors: Erich Geiger, VS-Unterkirnach; Hans-Joachim Platte, Hemmingen; Martin Plantholt, Bad Camberg; Dietrich Westerkamp, Hanover; Uwe Riemann, Braunschweig; Dietmar Hepper, Hanover, all of Fed. Rep. of Germany

[73] Assignee: Deutsche Thomson-Brandt GmbH, Fed. Rep. of Germany

[21] Appl. No.: 868,339

[22] Filed: Apr. 15, 1992

Related U.S. Application Data

[63] Continuation of PCT/EP90/01472, Sep. 3, 1990.

[30] Foreign Application Priority Data

Sep. 15, 1989 [DE] Fed. Rep. of Germany ....... 3930964

[51] Int. Cl.$^5$ .................... H04N 7/00; H04N 11/00
[52] U.S. Cl. .................... 358/12; 358/141; 358/140
[58] Field of Search .......... 358/141, 140, 11, 12, 358/15, 16, 142

[56] References Cited

U.S. PATENT DOCUMENTS

| | | | |
|---|---|---|---|
| 4,855,811 | 8/1989 | Isnardi | 358/12 |
| 4,961,112 | 10/1990 | Sugimori et al. | 358/141 |
| 4,984,078 | 1/1991 | Skinner et al. | 358/141 |
| 5,179,443 | 1/1993 | Sugimori et al. | 358/141 |

FOREIGN PATENT DOCUMENTS

| | | |
|---|---|---|
| 3840054 | 9/1989 | Fed. Rep. of Germany . |
| 3843423 | 9/1989 | Fed. Rep. of Germany . |
| 3912470 | 10/1990 | Fed. Rep. of Germany . |
| 3926388 | 2/1991 | Fed. Rep. of Germany . |
| 4021698 | 1/1992 | Fed. Rep. of Germany . |
| WO89/02687 | 3/1989 | PCT Int'l Appl. . |
| 9014732 | 11/1990 | World Int. Prop. O. . |
| 9104637 | 4/1991 | World Int. Prop. O. . |

OTHER PUBLICATIONS

Schreiber, William F., "6-MHz Single-Channel HDTV Systems", HDTB Symposium, Ottawa, Oct. 1987, pp. 1-9.

"Der Weg zu PAL-Plus-Eine Kompatible Vergesserung des PAL-Systems", by A. Ziemer et al., Fernseh- Und Kino-Technik, vol. 43, No. 8, 1989, pp. 407-410.

"HDTV and Today's Broadcasting World" by Y. Ono, Better Video Images, 23rd Annual SMPTE Television Conf., San Francisco, Calif., Feb. 3-4, 1989, pp. 312-360.

"A Compatible Enhanced Quality Television System (HVBL System)", by Y. Si-Le et al., Symposium Record, Broadcast Sessions, 5th International T.V. Symposium, Montreux, Switzerland, Jun. 11-17, 1987, pp. 45-54.

Primary Examiner—James J. Groody
Assistant Examiner—Safet Metjahic
Attorney, Agent, or Firm—Joseph S. Tripoli; Eric P. Herrmann; Ronald H. Kurdyla

[57] ABSTRACT

In the process of generating a compatible 4:3 letterbox format television signal, a wide aspect ration 16:9 progressive scan television signal is vertically transcoded from 575 to 431 image lines, converted to line interlaced form and horizontally compressed. A vertically transcoded interlaced luminance component is converted back to progressive scan form via interpolation, and subtracted from a vertically transcoded original progressive scan luminance component to produce a difference (helper) signal. The difference signal is time compressed and multiplexed into upper and lower edge bar regions of the letterbox format. The compatible letterbox signal also is encoded with additional information including vertical high frequency information and horizontal high frequency information separated during the transcoding and compression processes, respectively. The encoding includes modulating the color subcarrier frequency with luminance information, and intraframe averaging. The difference signal and encoded additional information are used by a 16:9 widescreen receiver to produce a 16:9 progressive scan image display with the transcoded number of lines and good resolution.

16 Claims, 9 Drawing Sheets

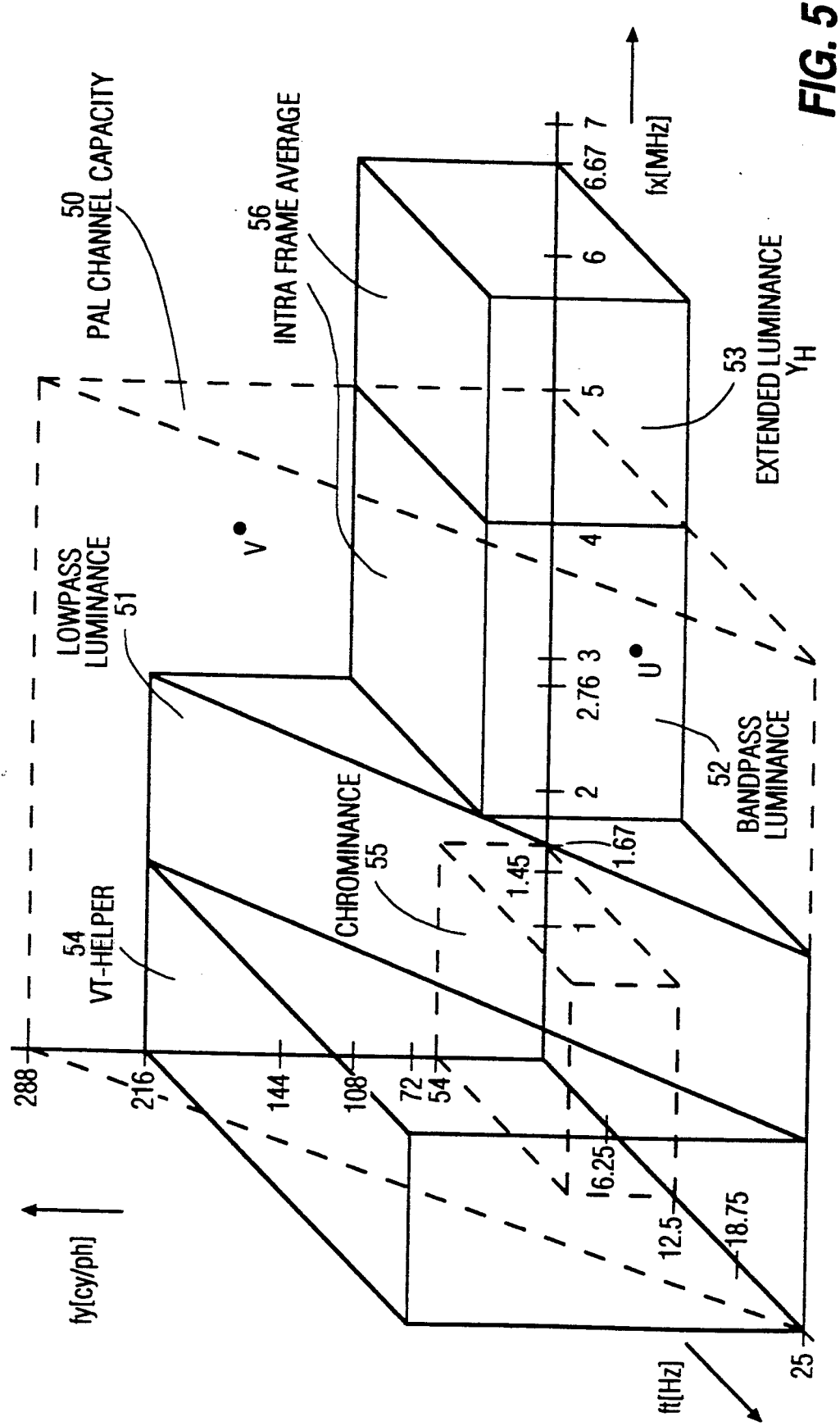

AUXILIARY SIGNAL TO ASSIST CONVERSION OF A LETTERBOX STANDARD ASPECT RATIO TELEVISION SIGNAL TO A WIDE ASPECT RATIO SIGNAL

This is a continuation of PCT application PCT/EP90/01472 filed Sep. 3, 1990 by Erich Geiger, Hans-Joachim Platte, Martin Plantholt, Dietrich Westerkamp, Uwe Riemann and Dietmar Hepper and titled TV Transmission System.

FIELD OF THE INVENTION

The invention relates to a system for processing a compatible television signal containing a wide image aspect ratio information.

BACKGROUND OF THE INVENTION

The introduction of the 16:9 wide aspect ratio image format into existing television standards with a 4:3 aspect ratio format (for example PAL, SECAM, NTSC) has resulted in the so-called "letter box" image display format. This format is well known and is discussed, for example, in "Improvement Options and Development Tendencies in PAL", G. Holoch, Lecture FKTG 17 January 1989 in Berlin, Germany; "Future Television Systems", F. Müller-Römer, Fernseh-und Kinotechnik, Vol. 43, No. 6/1989; and "New Paths of the Old PAL", Dr. A. Ziemer etal, Funkschau No. 18/1989. In the compatible letterbox format a 16:9 image is displayed by a 4:3 receiver in a central display area, with bar regions along upper and lower image edges containing other information which is typically suppressed so as to be invisible to a viewer.

Illustratively, at a studio (transmitter) a 16:9 interlace image with 625 total lines and 575 active image lines is generated. Every fourth imaqe line is frame-wise removed and transmitted as additional information with reduced amplitude in the bar regions above and below the active central image area. In such case the active image area in a 4:3 receiver comprises 431 lines, and the bar regions each contain 72 lines. With this format a 16:9 image can be displayed compatibly by a 4:3 receiver without any readjustment on the part of the viewer. The ratio of original number of lines to the reduced number of lines, and geometric distortion is compensated by removing lines. A 16:9 receiver processes the information contained in the bar regions and increases the number of the active lines, which had been reduced to 431, back to 575, thereby generating a 16:9 image in interlace form which occupies the 16:9 display area. However, process-dependent artifacts can be present, and the disadvantages of the interlace process (for example, line and edge flicker) are still present.

SUMMARY OF THE INVENTION

A system according to the present invention comprises a compatatible television signal processing system for a 16:9 television signal which in standard 4:3 aspect ratio receivers provides images in the letterbox format, and in improved receivers provides images in full 16:9 progressive scan format with horizontal resolution corresponding to that of the source signal.

In an illustrated embodiment, at a transmitter, a progressive scan television signal with a 16:9 image aspect ratio (format) and with 575 active image lines is digitized transcoded vertically to 431 active lines, converted into a line interlaced signal, provided with additional enhancement information and transmitted as a compatible television signal in the known letterbox format.

The additional information comprises signal components which help to develop, from the interlace signal, a progressive scan signal with vertical resolution approximating that of the source signal (as discussed, for example, in German patent 3912470), vertical high frequency components which are separated in the transcoding process at the transmitter (as discussed, for example, in German patent 3926388), and high horizontal high frequency components which are separated in the process of horizontal compression when converting from 16:9 to the 4:3 format (as discussed, for example, in German patent 3926388).

In contrast to the process described in German patent 39122470, the additional information used in the system according to the present invention is not generated for recovering a progressive television signal with 575 active lines with an identical image format, but rather for recovering a progressive television signal which has been transcoded to 431 lines and which has had its picture format changed for transmission.

The additional information can be transmitted in upper and lower bar regions as well as in the vertical blanking interval (as discussed in German patent 3912470), and also by modulating the color carrier frequency (as discussed in German patent 39226388).

A standard 4:3 receiver does not process the additional information, but rather displays the television signal in the letterbox format. An improved receiver with a widescreen 16:9 image display format includes a decoder which processes the additional information to develop a full 16:9 picture display in progressive scan form with 431 lines.

Additional information which supports the progressive scan display in the 16:9 receiver is sometimes referred to as a "helper signal". In the illustrated embodiment of the invention, in the process of generating the helper signal at the transmitter/encoder, a progressive scan image signal which has been vertically transcoded from 575 to 431 active lines is converted to interlaced form. This interlaced transcoded signal is interpolated into a progressive scan signal, which is subtracted from the original transcoded progressive scan signal, producing a difference signal corresponding to the helper signal. The helper signal is converted to compatible interlaced form, lowpass filtered and time compressed. The helper signal can be advantageously transmitted in the bar regions of the letterbox format by means of a time multiplexing process, and can modulate the standard color subcarrier frequency which is processed by a standard 4:3 receiver. The modulating helper signal exhibits reduced magnitude (e.g., in a blacker-than-black region) so as not to appear as a disturbing artifact in a displayed image. Such blacker-than-black amplitude modulation is described, for example, in German patent 4,021,698.

Additional information which represents horizontal high frequency luminance information can be transmitted advantageously in the active picture region by means of modulation at the color carrier frequency, whereby such luminance components are combined with the chrominance components. Cross-color and cross-luminance interference can be avoided in a 16:9 receiver display if these combined signal components are subjected to intraframe processing, e.g., averaging, before being transmitted.

BRIEF DESCRIPTION OF THE DRAWINGS

FIG. 5 is a three dimensional representation of luminance and chrominance resolution.

DETAILED DESCRIPTION

Figure 1:
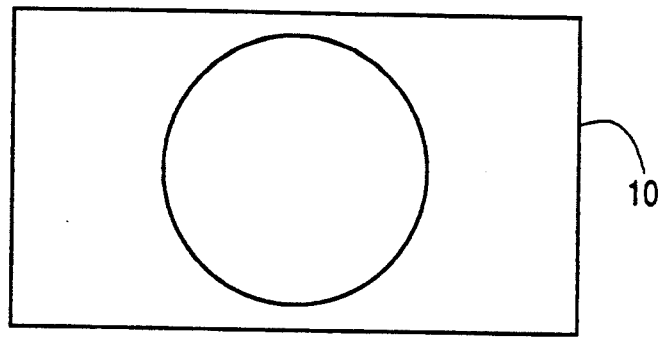
FIG. 1 illustrates a circular image in a 16:9 widescreen format.

FIG. 1 depicts an image, including a circular component, with a 16:9 image aspect ratio such as may be generated by a 16:9 camera at a television studio.

Figure 2:
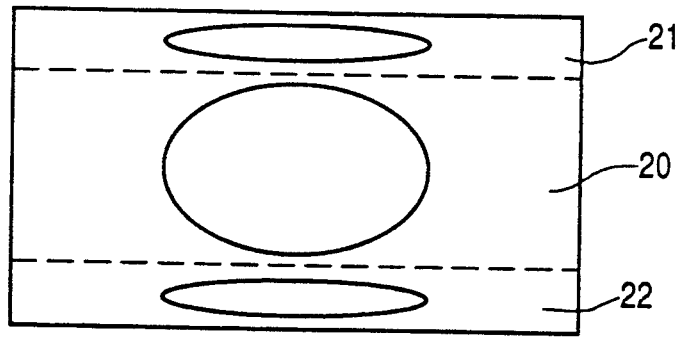
FIG. 2 shows the display of FIG. 1 after vertical compression of the main image region, and with additional information in bar regions.

FIG. 2 shows the image of FIG. 1 after vertical compression of active region 20 in a 16:9 coder. From the original 575 active lines 10 in FIG. 1, vertical compression by a factor 4/3 produces 431 lines in active region 20 of FIG. 2 so that the image may eventually be displayed by a 4:3 receiver. This vertical compression is produced by removing every fourth image line from the original image (FIG. 1), or by using vertical interpolation. The compression alters the geometry of the circular image. The lines removed from active image region 20, or lines required for decoding at a 16:9 receiver, are transmitted in the two edge bar regions 21 and 22 as an additional signal.

Figure 3:
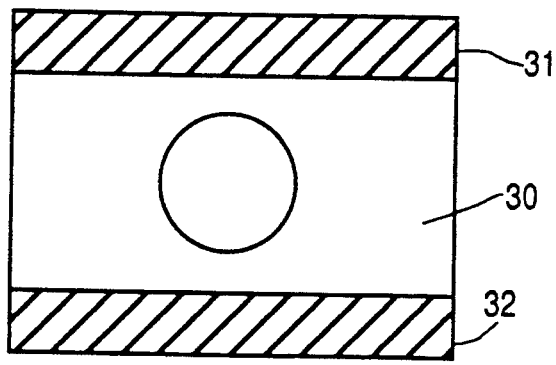
FIG. 3 depicts the main image region of FIG. 2 displayed in a "letterbox" format.

FIG. 3 depicts a 4:3 receiver display of active region 20 from FIG. 2 in an active region 30. Through horizontal compression of the 16:9 format into the 4:3 format by a factor 4/3, the original geometry of the circular image from FIG. 1 is restored. A viewer has available to him the full picture content from FIG. 1, but with reduced vertical resolution and with black bars 31, 32 along upper and lower image edges. To prevent the additional signal contained in the bar regions from becoming visible and disturbing a viewer, its amplitude is reduced at the 16:9 coder to a blacker-than-black region (i.e., between synchronization and black level). In a 16:9 receiver the additional signal in bar regions 31, 32 is correspondingly amplified and, together with active image region 30 after horizontal expansion, regenerates a wide aspect ratio image as shown in FIG. 1.

In a 16:9 television transmission system according to the invention, the image of FIG. 1 is a progressive scan source signal with a 16:9 aspect ratio. The 575 active lines are vertically transcoded by a factor ¾ to produce a television signal with an active image area 20 having 431 lines for a standard 4:3 receiver and for a widescreen 16:9 receiver. This transcoding may be produced by vertical interpolation using digital filters. The transcoding alters the geometry of the circular image in the active area, as shown in FIG. 2. Afterwards, the progressive scan 431 line signal including upper and lower bar regions is converted to a line interlaced signal which is horizontally compressed by a factor ¾.

The additional signals include spectral components and signal components separated during horizontal compression which allow a 16:9 receiver to generate, from the 431 line interlace signal (area 30 in FIG. 3) a progressive signal with 431 lines and vertical resolution which approximates that of the 431 line source signal. The spectral components from the horizontal compression process, as contained in the additional signal, permit a 16:9 receiver to produce horizontal resolution approximating that of the 431 line source signal.

The spectral components from the horizontal compression process are modulated at the (PAL) color carrier frequency and other components of the additional signals are transmitted in the vertical blanking interval and in the two bar regions. Analogous observations pertain to television systems with a different number of image lines.

Figure 7A:
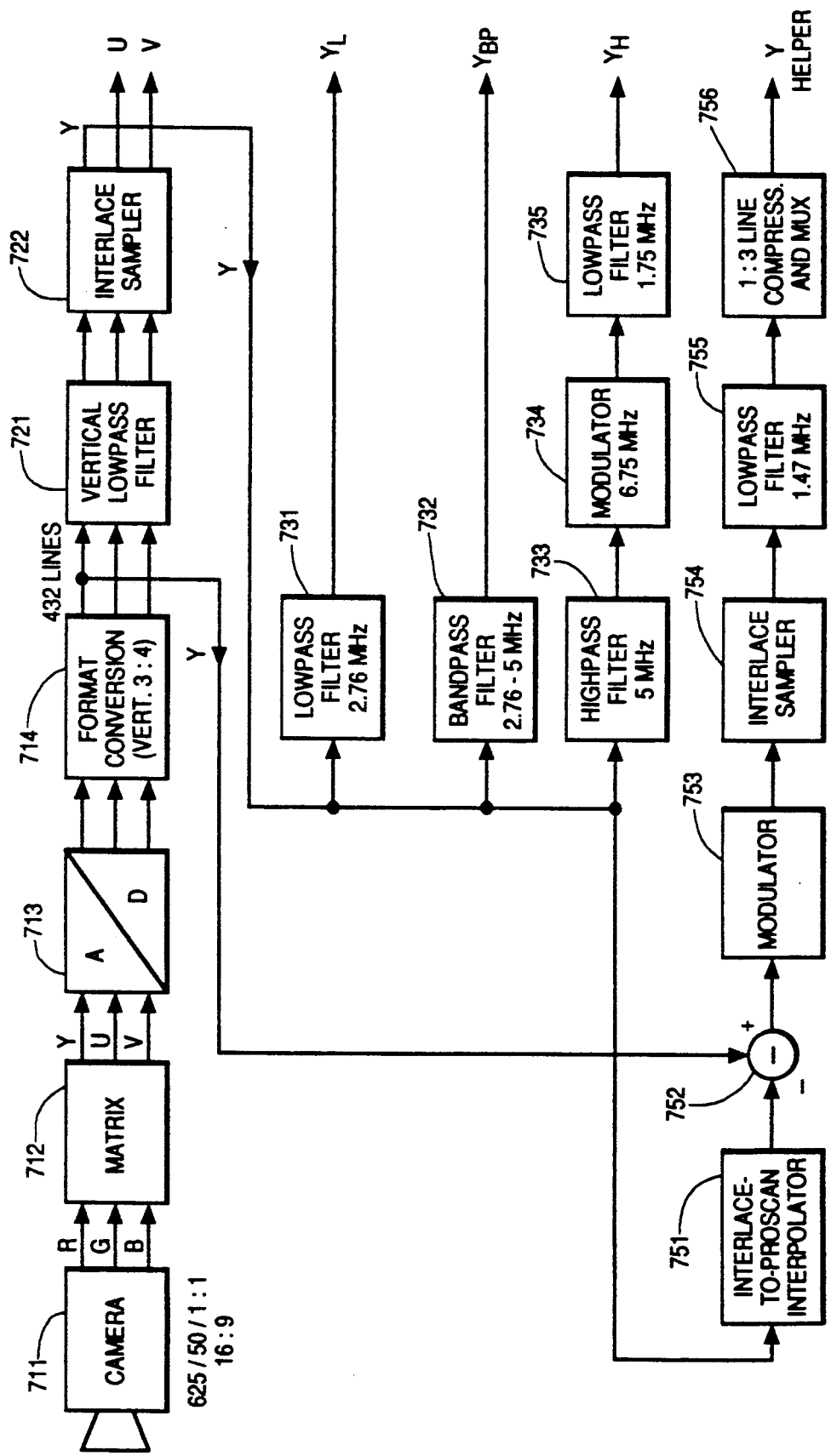
FIGS. 7a, 7b are a block diagram of an encoder arrangement.
Figure 7B:
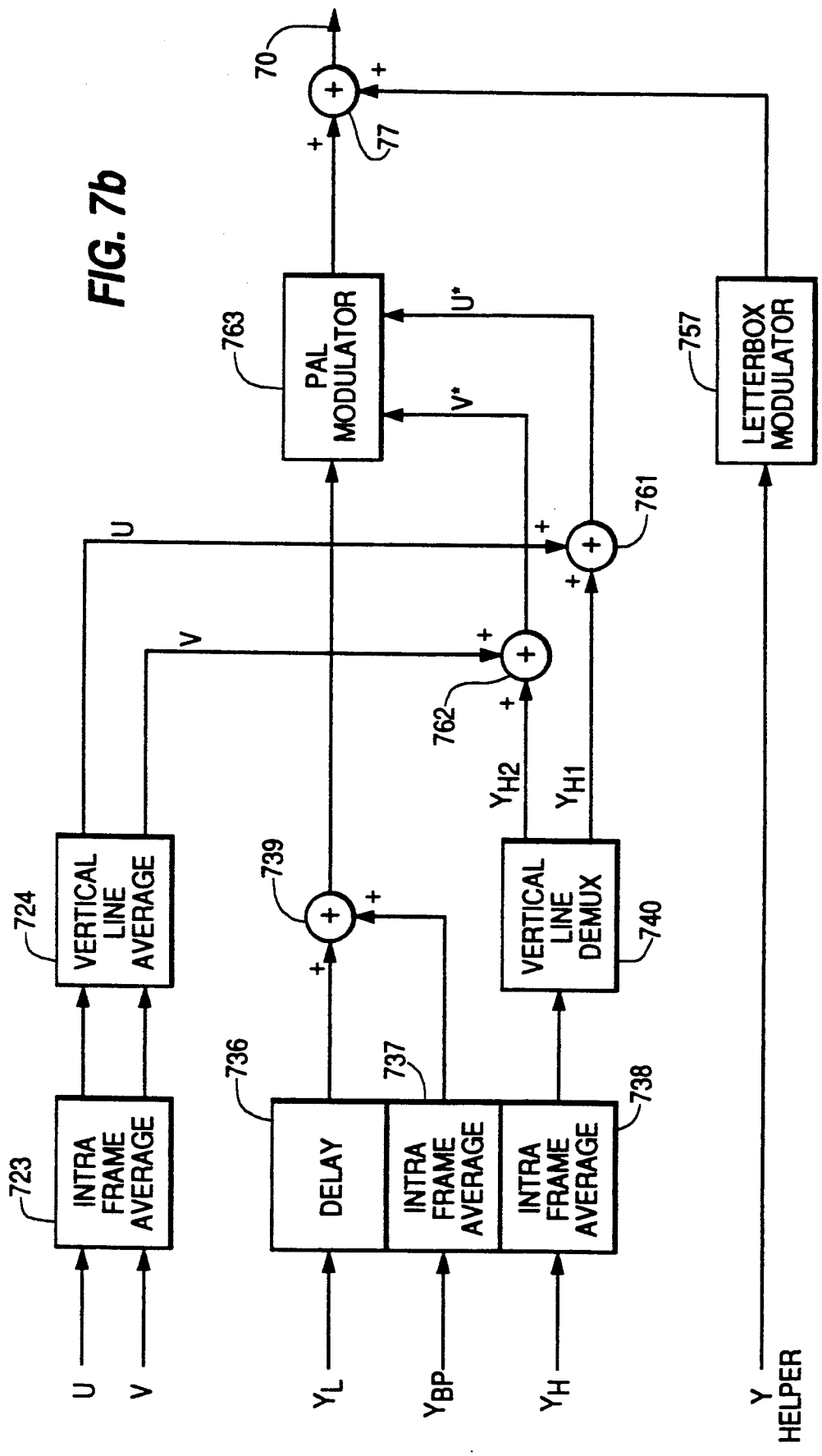

A coder for a television signal processing system according to the invention is shown in FIGS. 7a and 7b. A camera 711 generates RGB color image signals with a standard 625 lines/50 Hz/1:1 progressive scan format. The aspect ratio is 16:9, and the bandwidth of the RGB signals is 13.34 MHz. The RGB signals from camera 711 are applied to a matrix 712 in which they are converted into luminance and chrominance components Y, U, V, and are converted to digital form by an analog-to-digital converter 713. Digital output signals from converter 713 are applied to a format converter 714 which vertically transcodes (converts) 576 active lines into 432 active lines. Converter 714 may contain, for example, four line memories and a polyphase FIR filter with fifteen coefficients: $-2, -5, -6, -1, 12, 29, 44, 50, 44, 29, 12, -1, -6, -5, -2$. Television signals with a 1250/50/2:1 interlaced standard format can also be transcoded by using an appropriately configured converter 714.

The Y, U, V components are vertically prefiltered by a lowpass filter 721 to reduce or eliminate aliasing effects in the interlaced signal. Lowpass filter 721 illustratively may use the following coefficients: $-1, 2, 6, -31, 59, 186, 59, -31, 6, 2, -1$. In a subsequent circuit 722, the progressive scan components are subsampled to the interlaced format. The U and V chrominance components from unit 722 are applied to a first intraframe averaging circuit 723 (FIG. 7b), and afterwards to a vertical line averager 724. In intraframe averager 723, within each field the average is formed of the values of two picture elements lying one above the other in a pair of adjacent lines, and this average value is substituted for the values of the two original picture element values, as is known. In averager 724, an average value is obtained from two average values formed in intraframe average circuit 723 which lie over each other, and inserted as the value for the U and V components of the corresponding four picture elements which lie over each other (see FIG. 6). A vertical frequency resolution of 54 cy/ph (cycles per picture height) for chrominance components U and V results at this point. Output signals from unit 724 are respectively applied to first and second adders 761 and 762.

Luminance component Y from interlace circuit 722 is applied to a lowpass filter 731, a bandpass filter 732, a highpass filter 733 and an interlaced to progressive scan interpolator 751. A signal YL with a cutoff frequency of 2.76 MHz is produced at an output of lowpass filter 731. The following coefficients can be used by filter 731 for this purpose. −1, −2, 2, 6, 1, −13, −15, 20, 77, 106, 77, 20, −15, −13, 1, 6, 2, −2, −1.

A signal Ybp with a frequency range of 2.76 MHz to 5 MHz is produced at an output of bandpass filter 732. For this purpose the following coefficients can be used by filter 732: 2, 1, −4, 0, −9, 15, 29, −58, −19, 86, −19, −58, 29, 15, −9, 0, −4, 1, 2.

Luminance signal YL is applied to an adder 739 (FIG. 7b) via a delay circuit 736. Signal Ybp is applied to adder 739 via an intraframe-averager circuit 737. The output signal of adder 739 including components YL and Ybp is digital-to-analog converted (not illustrated) and applied to an input of a PAL television modulator 763.

The output signal of highpass filter 733 contains frequency components within a range of 5 MHz through 6.67 MHz, which can be produced with filter coefficients −1, 1, 2, −6, 8, 2, −15, 38, −58, 66, −58, 38, −15, −2, 8, −6, 2, 1, −1. This signal modulates a 6.75 MHz carrier in a modulator 734. The baseband component of the output signal from modulator 734 is separated by a 1.75 MHz lowpass filter 735, to produce a signal YH. Filter 735 can use coefficients 1, 0, −3, 0, 10, 16, 10, 0, −3, 0, 1 for this purpose.

Signal YH is applied to an intraframe averager circuit 738 in FIG. 7b. From there it is line demultiplexed by a unit 740, which generates output luminance signal components YH1 and YH2. YH1 is applied to adder 761 to form, with the U chrominance component, signal U*. Signal YH2 is applied to adder 762 to form, with the V chrominance component, signal V*. Signals U* and V* are digital-to-analog converted (not illustrated) and are also applied to PAL modulator 763. Signal YH is transmitted in the active image area. The output signal from PAL modulator 763 is applied to an adder 77.

In interpolator 751 (FIG. 7a) a progressive scan signal with 432 active lines is developed from the 432 active interlaced lines. A corresponding interpolation occurs at a decoder in a widescreen receiver. The output signal from interpolator 751 is subtracted in a subtractor 752 from the Y output component of format converter (vertical transcoder) 714 to produce a helper signal. This signal will help enhance vertical image resolution at a 16:9 wide aspect ratio receiver. The line difference (helper) signal from unit 752 is converted by modulator 753 to a baseband position, and afterwards is applied to an interlace circuit 754 for converting the helper signal to line interlaced form. The output signal from unit 754 is low pass filtered by a 1.47 MHz horizontal low pass filter 755, which may employ coefficients: −4, −2, 1, 9, 21, 34, 45, 48, 45, 34, 21, 9, 1, −2, −4.

The filtered helper signal from unit 755 is time compressed with a factor of 3 by a unit 756. Groups of three compressed helper signals are multiplexed by unit 756 into each horizontal image line within the edge bar regions, so that the bar regions contain 2×72 lines. The filtered and compressed luminance helper signal from unit 756 is digital-to-analog converted (not shown), applied to a letterbox format modulator 757 (FIG. 7b) and afterwards combined with the output signal from modulator 763 in adder 77, producing output signal 70.

The helper signal modulates the color subcarrier frequency in letterbox modulator 757. The direct voltage level at the output of modulator 757 lies 50 mV beneath the black level, i.e., at a blacker than black level, and the modulated signal has a peak amplitude of 500 mV. The chrominance components do not require a helper signal because the vertical resolution of the chrominance signal does not exceed the maximum vertical frequency which can be transmitted in the interlace format. Output signal 70, which is transmitted, contains components YL, Ybp, YH, U, V and the helper signal from adder 77. −2, The process of intraframe averaging results in a temporal resolution of 12.5 Hz for signals Ybp, YH, U and V. Intraframe averagers 723, 737 and 738 contain a circuit of the type shown in FIG. 9. An input signal 90 is applied to an adder 93. The output of adder 93 is conveyed via a frame memory 94 and via a separate line to inputs of a switch 92, from an output of which the output signal of the circuit is obtained. The output of frame memory 94 and a ground reference potential are coupled to inputs of a switch 91, the output of which is coupled to an input of adder 93. During a first field, the first field is written into memory 94. At the same time, memory 94 is read out, and this signal (initially with no image content) is applied to the circuit output. During a second field, the sum of the first field read out from memory 94 and the second field present at input 90 is written into memory 94. This sum signal is also provided at the circuit output. Subsequently, a third field is written into memory 94 while, at the same time, the stored sum signal from the first and second fields is read out from memory 94 and applied to the output of the circuit. During a fourth field, the sum signal from the stored third field and the fourth field present at input 90 is written into memory 94 and applied to the circuit output. This process repeats for successive fields.

A maximum vertical frequency of 216 cy/ph can be transmitted with 431 active lines or, respectively, 432 lines. Chrominance components U and V occupy 2×54 cy/ph. A remaining spectral space of 108 cy/ph in the fy direction can contain high frequency luminance signal component YH. The horizontal bandwidth of chrominance components U and V is approximately 1.67 MHz. There results, together with the vertical resolution of 54 Cy/ph, a correctly proportioned fx/fy resolution equal to a quarter of the corresponding luminance resolution.

Figure 6:
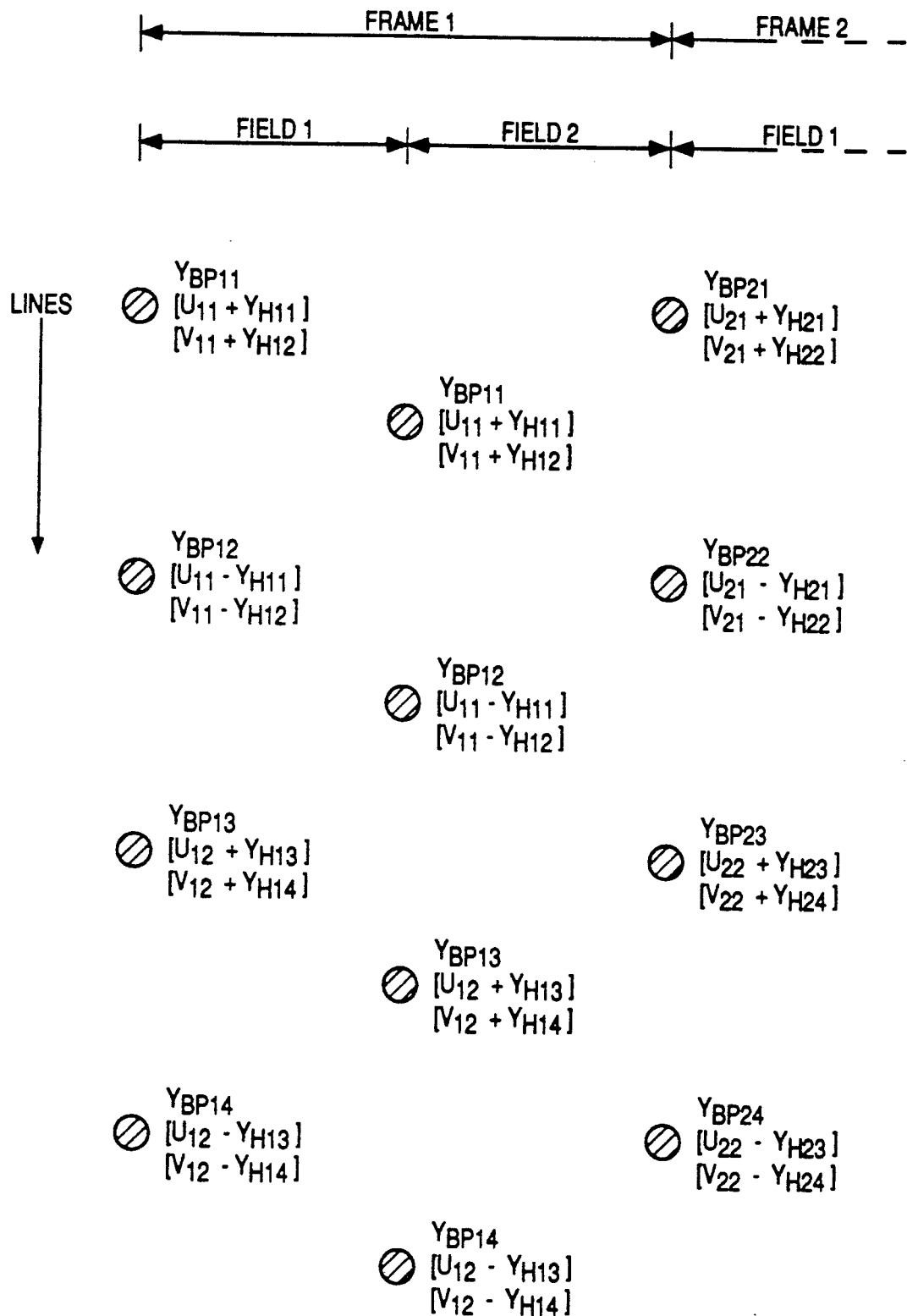
FIG. 6 depicts an image coding scheme.

FIG. 6 illustrates the arrangement of signal components in the corresponding lines. In four lines of a frame, signals U and V, which lie vertically above each other in the frame, are equal. Signals Yh in two of these four lines are equal. In the first pair of lines signals Yh are added to the U and V components. In the second pair of lines they are subtracted from the U and V components. This continues within a frame. After a frame delay, components U and V exhibit a phase delay of nearly 180 degrees. Thus all color sub-carrier modulated signal components (cross-luminance) in the bandpass region (Ybp) can be removed by adding two frames. Accordingly, the chrominance components can be obtained free of cross-talk through addition of adjacent lines, and signal Yh can be obtained through subtraction of adjacent lines.

Figure 4A:
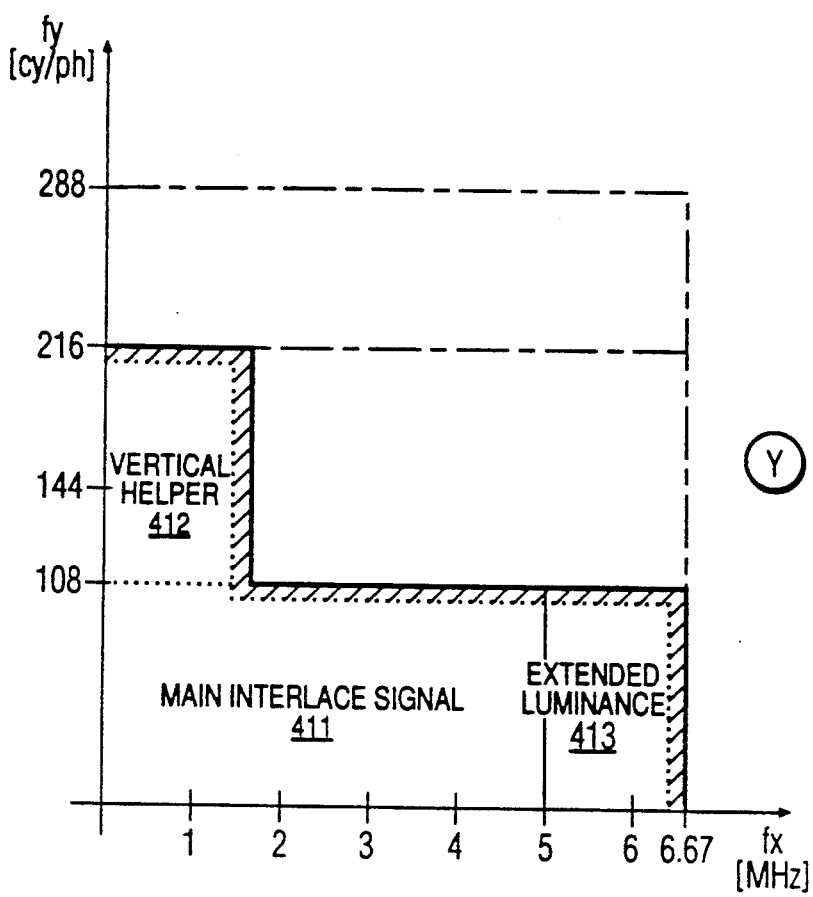
FIGS. 4a, 4b are a two-dimensional representation of luminance and chrominance resolution.
Figure 4B:
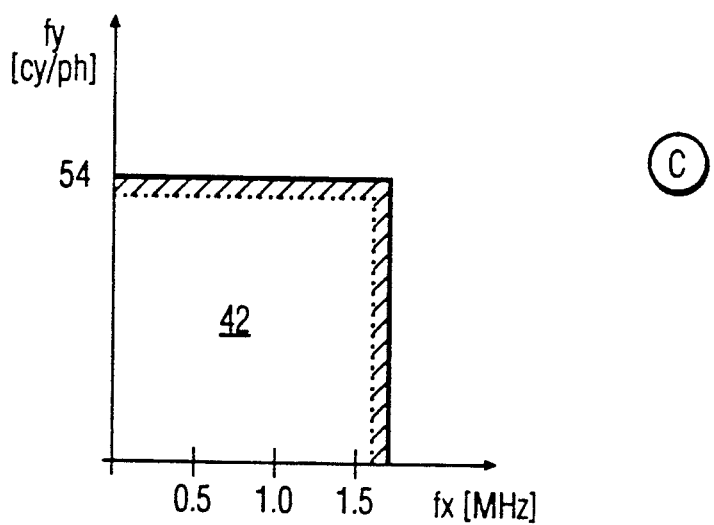

The transmitted spectral regions of the luminance and chrominance components in the fy/fx domain are illustrated in FIG. 4. FIG. 4a illustrates main interlace signal region 411, helper signal region 412 and high frequency luminance component Yh region 413. Spectral region 42 for chrominance components U and V is shown in FIG. 4b.

In FIG. 5, the spectral regions for signals YL, Ybp, YH and the helper signal are shown in three dimensional fy/fx/ft space as regions 51, 52, 53 and 54, respectively. FIG. 5 also indicates the spectral locations of chrominance components U and V, transmitted spectral region 55 for chrominance signals, and transmission capacity 50 of a PAL channel. Spectral region 52 for component Ybp and spectral region 53 for component YH together produce a region 56 which is subject to the intraframe averaging process.

Figure 8:
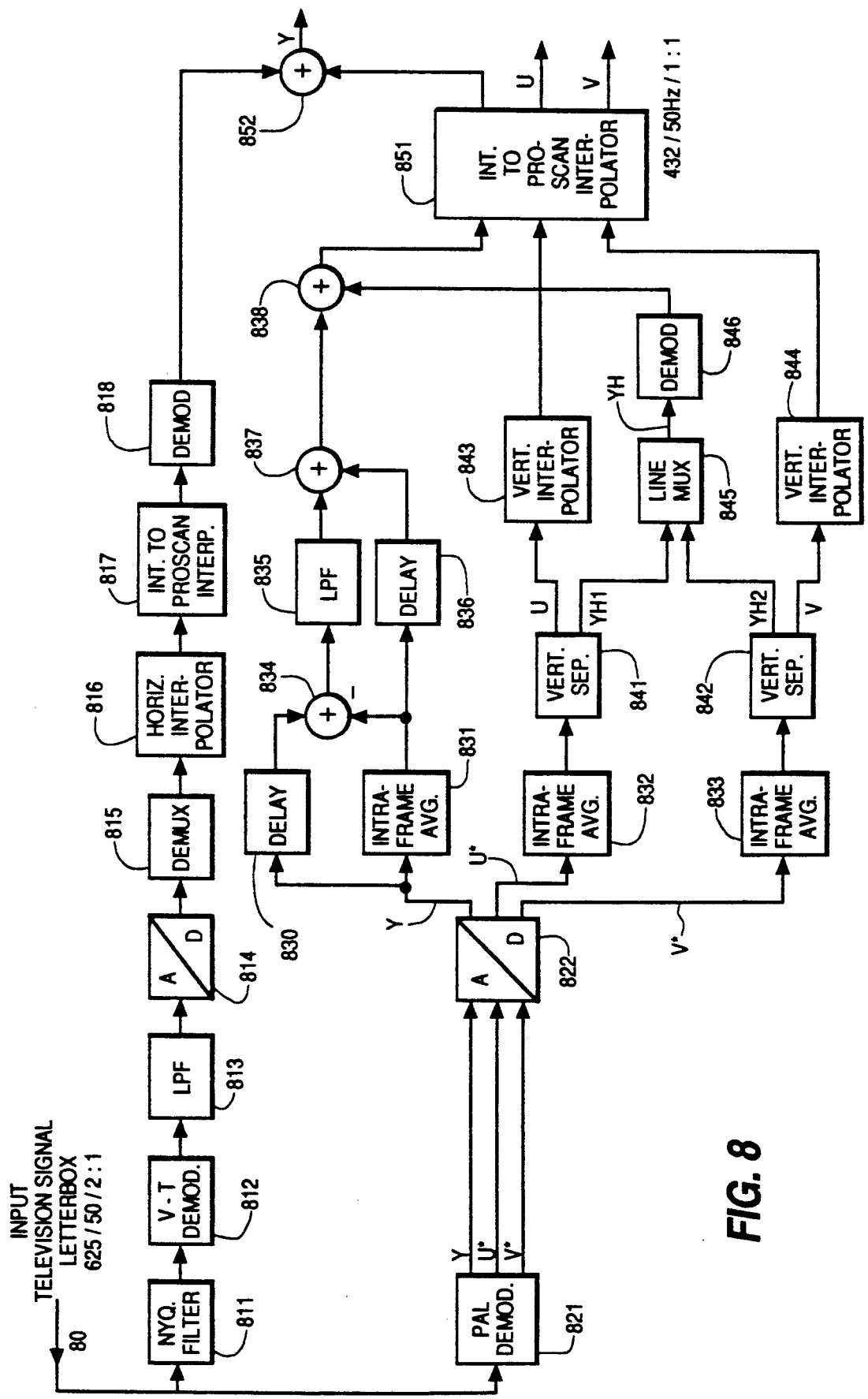
FIG. 8 is a block diagram of a decoder in a wide aspect ratio receiver.

FIG. 8 shows apparatus in a wide aspect ratio 16:9 receiver for decoding the signal generated as discussed above. An input signal 80 is applied to a Nyquist filter 811 and to a PAL demodulator 821. PAL demodulator 821 advantageously does not require a line delay circuit. The output signal from Nyquist filter 811 is applied to a vertical-temporal (V-T) demodulator 812 for demodulating the color subcarrier to recover the helper signal. The helper signal from demodulator 812 is filtered by a 4.43 MHz horizontal lowpass filter 813 before it is applied to an analog-to-digital converter 814.

The helper signal components are placed in the original line positions by means of line storage and demultiplexer circuit 815. The output signal from unit 815 is horizontally interpolated by unit 816 or, respectively, expanded and arranged with respect to the picture elements of the 432 active lines. A filter with coefficients 1, 2, 3, 2, 1 can be used to accomplish this.

The helper signal is converted from interlaced to progressive scan format by interpolator 817. Demodulator 818 uses appropriate line and frame weighting (e.g., ±1) to shift the helper signal into the correct spectral position within the fy/ft region. Afterwards the helper signal is applied to an adder 852. In this example an amplitude resolution of six bits is sufficient for the helper signal.

The Y, U*, V* components from PAL demodulator 821 are coupled to an analog-to-digital converter 822. The digital Y signal from converter 822 is applied to a delay circuit 830 and to an intraframe averager circuit 831. The output signal of circuit 831 is applied to a delay circuit 836, and is subtracted from the output signal of delay circuit 830 in a subtractor 834. The output signal of subtractor 834 is coupled to an adder 837 via a lowpass filter 835. The output signal from delay circuit 836 also is applied to adder 837. The output signal of adder 837 includes luminance components YL and Ybp, and is applied to an adder 838. Signal U* from analog-to-digital converter 822 is coupled to a second intraframe averager circuit 832, the output of which is coupled to a vertical separator 841.

Figure 9:
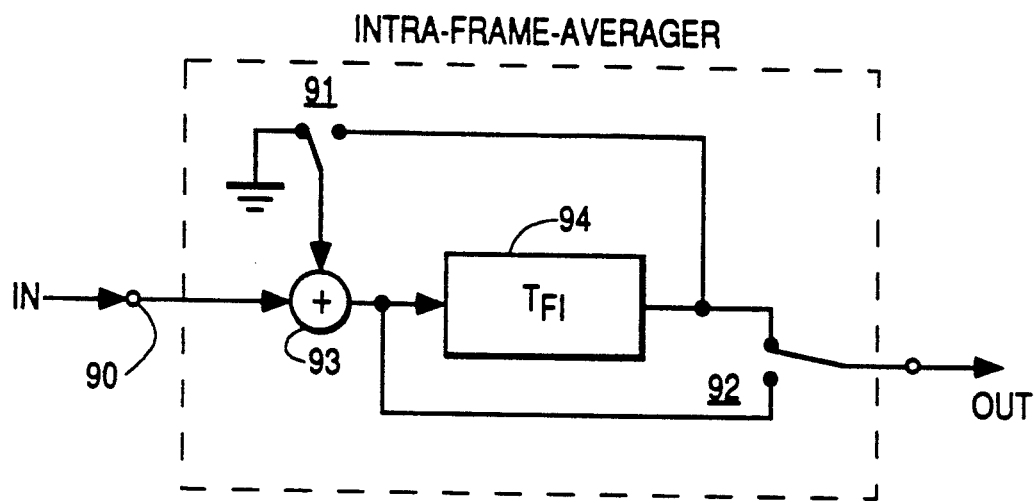
FIG. 9 shows apparatus for intraframe averaging.

Signal V* is processed by an intraframe averager circuit 833 before being processed by a vertical separator 842. Intraframe averager circuits 832 and 833 operate in the same manner as intraframe averager 831 and as shown in FIG. 9. Vertical separator 841 supplies signals U and Yh1 at its outputs. Vertical separator 842 provides signals V and Yh2 at its outputs.

Figure 10:
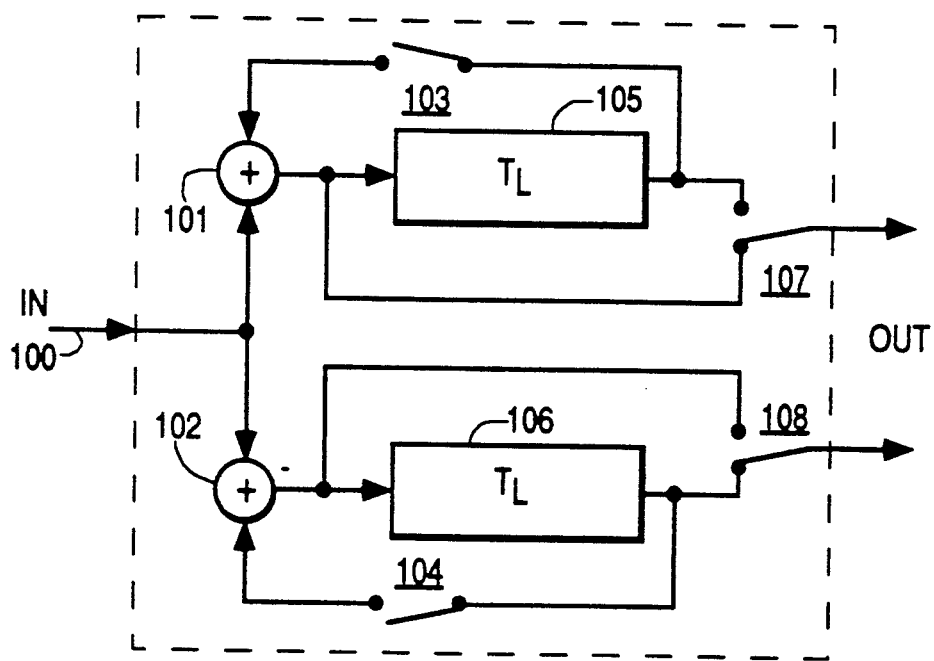
FIG. 10 illustrates a vertical separator.

Vertical separators 841 and 842 illustratively contain circuits as shown in FIG. 10. Input signal 100 is coupled to an adder 101 and to a subtractor 102. The output of adder 101 is coupled, via a line delay 105 and via a direct path, to inputs of a switch 107. The output of subtractor 102 is coupled, via a line delay 106 and via a direct path, to inputs of a switch 108. The output signal of line delay 105 is coupled via a switch 103 to adder 101. The output signal delay circuit 106 is coupled via a switch 104 to subtractor 102. From the outputs of switches 107 and 108 are provided, respectively, signals U and Yh1 or Yh1 and V. The operation of the circuit corresponds to that of the circuit in FIG. 9.

In FIG. 8, the U signal from separator 841 is coupled to a vertical interpolator 843 and the V signal from separator 842 is coupled to a vertical interpolator 844. Missing U and V picture elements are formed in these interpolators and, together with existing picture elements, are applied to interlace-to-,,,, progressive interpolator 851. Signal components Yh1 and Yh2 are combined in a line multiplexer 845 and are provided as signal YH to a demodulator 846. There, they are shifted back into the correct spectral position through appropriate picture element weighting (e.g., ±1). The output signal demodulator 846 is ,,,, coupled to adder 838. The luminance output signal of adder 838 is applied to interlace-to-progressive scan interpolator 851.

The helper signal is added to the luminance output signal of interlace-to-progressive interpolator 851 by means of an adder 852. The combined Y component from adder 852 and the U and V components from interlace-to-progressive interpolator 851 are converted from digital to analog form (not shown). As a result, a television signal with a 16:9 aspect ratio, 432 ,,,, active lines, 50 Hz frame repetition frequency, progressive scanning and a luminance bandwidth of 6.67 MHz, with reference to the PAL transmission channel, appears at the output of the decoder.

Figure 11:
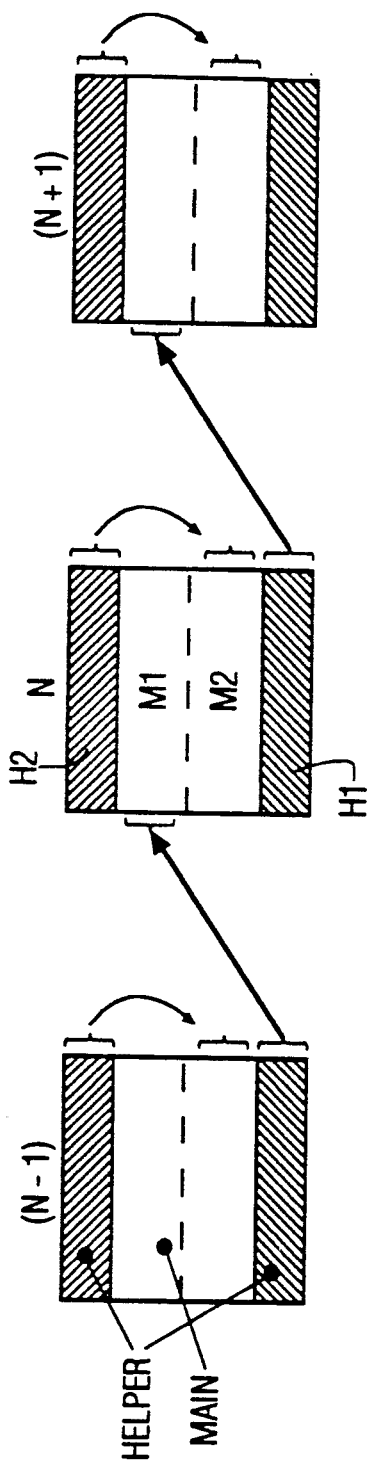
FIG. 11 illustrates the temporal sequence of helper signal transmission.

Advantageous aspects of the temporal processing of the helper signal is shown in FIG. 11. During reproduction of second lower half-picture M2 from frame N, the associated helper siqnal is already acquired. In the encoder, temporal processing and storage determines that the helper signal for upper half-,,c, picture M1 of frame N is transmitted in the lower edge band of previous picture frame N−1, and helper signal H2 for lower ,,,, half-picture M2 of frame N is transmitted in the upper edge band of picture N. Helper signal H1 for the upper half-picture of next image frame N+1 is transmitted in the lower edge band of image frame N. Decoder memory requirements are reduced with the described technique. For corresponding 16:9 receivers with 625 lines, the 432 active lines can be converted to 576 ,,,, active lines by using a format converter with an inverse function relative to format converter 714.

The described television system can be adapted for use with SECAM or NTSC television systems through appropriate modifications, for example filters and interpolators with other coefficients and appropriately formatted memory and operating controls.

We claim:

1. In a system for generating a television signal compatible with a standard television signal, said compatible television signal having a first image format in which (a) main image information exhibits a second image format with a wider aspect ratio than said first format and within said first format, and (b) additional information is included external to said main image information and within said first format, said additional information representing information for use by a receiver having a display area with said wide aspect ratio second format, together with said main image information, to produce a wide aspect ratio image utilizing said display area with said wide aspect ratio second format; apparatus comprising:

means for providing a progressive scan source image signal with said second format;

transcoding means for vertically transcoding said source signal by a factor substantially equal to the ratio of said first image format to said second image format, to produce a different number of image lines;

first converting means responsive to an output signal from said transcoding means for producing a signal in interlaced form having a horizontal resolution substantially equal to ,,,, that of a standard television signal image with said first format;

second interpolating means for converting an interlaced output signal from said first converting means to progressive scan form;

means for developing additional information representing the difference between said progressive signal from said first converting means and said progressive scan signal from said second converting means; and means for encoding said additional information in a portion of said television signal representing other than said main image information.

2. Apparatus according to claim 1, wherein
said additional information modulates a baseband frequency to produce a modulated signal; and
said modulated signal is conveyed in an edge region along an edge of said main image information.

3. Apparatus according to claim 2, wherein
said modulated signal is conveyed in a vertical blanking region.

4. Apparatus according to claim 2, wherein
said baseband frequency is a chrominance subcarrier frequency.

5. Apparatus according to claim 2, wherein
said modulated signal exhibits an amplitude within a blacker-than-black range.

6. Apparatus according to claim 1, and further including
means for low pass filtering said additional information; and
means for time compressing said additional information.

7. Apparatus according to claim 1, wherein
said additional information is in interlaced scan form and exhibits said first format.

8. Apparatus according to claim 1, and further including
means for encoding said main image information with auxiliary high frequency image information.

9. Apparatus according to claim 8, wherein said encoding means includes
means for splitting a luminance component of said television signal into a horizontal high frequency component, a horizontal medium frequency component and a horizontal lower frequency component;
means for combining said high frequency information and chrominance image information to produce combined information; and
means for intraframe processing said medium and high frequency luminance components and said chrominance information.

10. Apparatus according to claim 9, wherein
said auxiliary information modulates a baseband frequency.

11. Apparatus according to claim 10, wherein
said baseband frequency is a chrominance subcarrier frequency.

12. Apparatus according to claim 9, wherein
said intraframe processing means comprises an intraframe averager.

13. Apparatus according to claim 9, wherein
said intraframe processing means provides average values formed from said medium and high frequency components and from chrominance components within prescribed pairs of lines, and additionally for chrominance components within prescribed pairs of lines.

14. Apparatus according to claim 13, wherein
said luminance component is split into horizontal low and medium frequencies; and
said intraframe processing means forms average values from said medium frequency component and from chrominance components within prescribed pairs of lines.

15. Apparatus according to claim 1 wherein
additional information associated with said main image information of a current image (N) is transmitted in a lower edge portion of a preceding image (N−1) and in an upper edge portion of said current image (N).

16. In a wide aspect ratio television receiver for processing a compatible letterbox-type television signal having a first image format in which (a) main image information exhibits a second image format with a wider aspect ratio than said first format, and (b) additional information is included external to said main information within said first format to help construct a wide aspect ratio image for display by said receiver; apparatus comprising:

a Nyquist filter responsive to said television signal;
a first demodulator responsive to an output signal from said Nyquist filter for recovering information modulating a signal at a chrominance subcarrier frequency;
first means for lowpass filtering recovered information from said first demodulator;
first means for converting recovered information from an output of said lowpass filter to digital form;
a demultiplexer responsive to an output signal from said converting means for separating information contained in bar regions of said letterbox television signal;
horizontal interpolator means for horizontally expanding said separated bar region information;
interpolator means for converting expanded bar region information to progressive scan form;
a second demodulator responsive to an output signal from said interlace to progressive scan interpolator means, exhibiting line and frame weighted demodulation for providing an output signal corresponding to decoded additional information;
a television signal demodulator responsive to said television signal for providing demodulated luminance and chrominance components;
second means for converting said demodulated components from said television demodulator to digital form;
an intraframe averaging network for processing a luminance output of said second converting means;
a first adder for combining an output signal of said intraframe averaging network and a delayed version of an input signal applied to said intraframe averaging network;
second low-pass filtering means for filtering an output signal from said first adder;
a second adder for combining an output signal from said second low pass filtering means and a delayed version of an output signal from said intraframe averaging network;

first and second vertical interpolators for processing respective chrominance component outputs from said second converting means;

a second interlaced to progressive scan converter responsive to chrominance outputs from said first and second vertical interpolators and to an output from said second adder; and a third adder for combining a luminance output from said second interlaced to progressive scan converter with an output from said second demodulator corresponding to decoded additional information.

* * * * *